United States Patent [19]

Chen et al.

[11] Patent Number: 5,737,257

[45] Date of Patent: Apr. 7, 1998

[54] METHOD AND APPARATUS FOR COMPRESSION OF INTEGER MULTIPLICATION TABLE

[75] Inventors: Jason Chen, Ilan; Paul Chen; George Chang, both of Taichung, all of Taiwan

[73] Assignee: Holtek Microelectronics, Inc., Hsinchu, Taiwan

[21] Appl. No.: 527,792

[22] Filed: Sep. 13, 1995

[51] Int. Cl.⁶ .................................................. G06F 7/52
[52] U.S. Cl. ............................... 364/754.01; 364/757
[58] Field of Search ........................... 364/754, 755, 364/756, 757

[56] References Cited

U.S. PATENT DOCUMENTS

| | | | |
|---|---|---|---|
| 4,390,961 | 6/1983 | Negi et al. | 364/756 |
| 4,555,768 | 11/1985 | Lewis, Jr. et al. | 364/757 |
| 5,117,385 | 5/1992 | Gee | 364/757 |
| 5,255,216 | 10/1993 | Blanz et al. | 364/754 |

*Primary Examiner*—David H. Malzahn
*Attorney, Agent, or Firm*—Barnes, Kisselle, Raisch, Choate, Whittemore & Hulbert, P.C.

[57] ABSTRACT

A method of compressing an integer multiplication table including the steps of first eliminating one of the two symmetrical and identical sections in the table, eliminating the products of 0 multiplier and 0 multiplicand, moving the product of the multiplier having an index of n into the location of index (n−1) for the multiplier, using one-half of the number of the largest multiplier as the largest multiplier index for the compressed multiplication table, moving into the non-continuous memory space of the compressed multiplication table by a page-filling method the product of the largest multiplier index value that is larger than the compressed multiplication table such that the multiplication table after compression can be stored on the same page.

17 Claims, 8 Drawing Sheets

| X\Y | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 1 | 0 | 1 | 2 | 3 | 4 | 5 | 6 | 7 | 8 | 9 | 10 | 11 | 12 | 13 | 14 | 15 |
| 2 | 0 | 2 | 4 | 6 | 8 | 10 | 12 | 14 | 16 | 18 | 20 | 22 | 24 | 26 | 28 | 30 |
| 3 | 0 | 3 | 6 | 9 | 12 | 15 | 18 | 21 | 24 | 27 | 30 | 33 | 36 | 39 | 42 | 45 |
| 4 | 0 | 4 | 8 | 12 | 16 | 20 | 24 | 28 | 32 | 36 | 40 | 44 | 48 | 52 | 56 | 60 |
| 5 | 0 | 5 | 10 | 15 | 20 | 25 | 30 | 35 | 40 | 45 | 50 | 55 | 60 | 65 | 70 | 75 |
| 6 | 0 | 6 | 12 | 18 | 24 | 30 | 36 | 42 | 48 | 54 | 60 | 66 | 72 | 78 | 84 | 80 |
| 7 | 0 | 7 | 14 | 21 | 28 | 35 | 42 | 49 | 56 | 63 | 70 | 77 | 84 | 91 | 98 | 105 |
| 8 | 0 | 8 | 16 | 24 | 32 | 40 | 48 | 56 | 64 | 72 | 80 | 88 | 96 | 104 | 112 | 120 |
| 9 | 0 | 9 | 18 | 27 | 36 | 45 | 54 | 63 | 72 | 81 | 90 | 99 | 108 | 117 | 126 | 135 |
| 10 | 0 | 10 | 20 | 30 | 40 | 50 | 60 | 70 | 80 | 90 | 100 | 110 | 120 | 130 | 140 | 150 |
| 11 | 0 | 11 | 22 | 33 | 44 | 55 | 66 | 77 | 88 | 99 | 110 | 121 | 132 | 143 | 154 | 165 |
| 12 | 0 | 12 | 21 | 36 | 48 | 60 | 72 | 84 | 96 | 108 | 120 | 132 | 144 | 156 | 168 | 180 |
| 13 | 0 | 13 | 26 | 39 | 52 | 65 | 78 | 91 | 104 | 117 | 130 | 143 | 156 | 169 | 182 | 195 |
| 14 | 0 | 14 | 28 | 42 | 56 | 70 | 84 | 98 | 112 | 126 | 140 | 154 | 168 | 182 | 196 | 210 |
| 15 | 0 | 15 | 30 | 45 | 60 | 75 | 90 | 105 | 120 | 135 | 150 | 165 | 180 | 195 | 210 | 225 |

FIG.1a
(PRIOR ART)

| Y\X | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | | | | | | | | | | | | | | | |
| 1 | 0 | 1 | | | | | | | | | | | | | | |
| 2 | 0 | 2 | 4 | | | | | | | | | | | | | |
| 3 | 0 | 3 | 6 | 9 | | | | | | | | | | | | |
| 4 | 0 | 4 | 8 | 12 | 16 | | | | | | | | | | | |
| 5 | 0 | 5 | 10 | 15 | 20 | 25 | | | | | | | | | | |
| 6 | 0 | 6 | 12 | 18 | 24 | 30 | 36 | | | | | | | | | |
| 7 | 0 | 7 | 14 | 21 | 28 | 35 | 42 | 49 | | | | | | | | |
| 8 | 0 | 8 | 16 | 24 | 32 | 40 | 48 | 56 | 64 | | | | | | | |
| 9 | 0 | 9 | 18 | 27 | 36 | 45 | 54 | 63 | 72 | 81 | | | | | | |
| 10 | 0 | 10 | 20 | 30 | 40 | 50 | 60 | 70 | 80 | 90 | 100 | | | | | |
| 11 | 0 | 11 | 22 | 33 | 44 | 55 | 66 | 77 | 88 | 99 | 110 | 121 | | | | |
| 12 | 0 | 12 | 24 | 36 | 48 | 60 | 72 | 84 | 96 | 108 | 120 | 132 | 144 | | | |
| 13 | 0 | 13 | 26 | 39 | 52 | 65 | 78 | 91 | 104 | 117 | 130 | 143 | 156 | 169 | | |
| 14 | 0 | 14 | 28 | 42 | 56 | 70 | 84 | 98 | 112 | 126 | 140 | 154 | 168 | 182 | 196 | |
| 15 | 0 | 15 | 30 | 45 | 60 | 75 | 90 | 105 | 120 | 135 | 150 | 165 | 180 | 195 | 210 | 225 |

| X'\Y' | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 1 | 15 | 14 | 13 | 12 | 11 | 10 | 9 | 8 | 7 | 6 | 5 | 4 | 3 | 2 | 1 |  |
| 2 | 30 | 28 | 26 | 24 | 22 | 20 | 18 | 16 | 14 | 12 | 10 | 8 | 6 | 4 |  |  |
| 3 | 45 | 42 | 39 | 36 | 33 | 30 | 27 | 24 | 21 | 18 | 15 | 12 | 9 |  |  |  |
| 4 | 60 | 56 | 52 | 48 | 44 | 40 | 36 | 32 | 28 | 24 | 20 | 16 |  |  |  |  |
| 5 | 75 | 70 | 65 | 60 | 55 | 50 | 45 | 40 | 35 | 30 | 25 |  |  |  |  |  |
| 6 | 90 | 84 | 78 | 72 | 66 | 60 | 54 | 48 | 42 | 36 |  |  |  |  |  |  |
| 7 | 105 | 98 | 91 | 84 | 77 | 70 | 63 | 56 | 49 |  |  |  |  |  |  |  |

FIG.1d

| X'\Y' | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | 15 | 14 | 13 | 12 | 11 | 10 | 9 | 8 | 7 | 6 | 5 | 4 | 3 | 2 | 1 | 225 |
| 1 | 15 | 14 | 13 | 12 | 11 | 10 | 9 | 8 | 7 | 6 | 5 | 4 | 3 | 2 | 196 | 210 |
| 2 | 30 | 28 | 26 | 24 | 22 | 20 | 18 | 16 | 14 | 12 | 10 | 8 | 6 | 169 | 182 | 195 |
| 3 | 45 | 42 | 39 | 36 | 33 | 30 | 27 | 24 | 21 | 18 | 15 | 12 | 144 | 156 | 168 | 180 |
| 4 | 60 | 56 | 52 | 48 | 44 | 40 | 36 | 32 | 28 | 24 | 20 | 121 | 132 | 143 | 154 | 165 |
| 5 | 75 | 70 | 65 | 60 | 55 | 50 | 45 | 40 | 35 | 30 | 100 | 110 | 120 | 130 | 140 | 150 |
| 6 | 90 | 84 | 78 | 72 | 66 | 60 | 54 | 48 | 42 | 81 | 90 | 99 | 108 | 117 | 126 | 135 |
| 7 | 105 | 98 | 91 | 84 | 77 | 70 | 63 | 56 | 64 | 72 | 80 | 88 | 96 | 104 | 112 | 120 |

METHOD AND APPARATUS FOR COMPRESSION OF INTEGER MULTIPLICATION TABLE

FIELD OF THE INVENTION

The present invention generally relates to a method and apparatus for the compression of an integer multiplication table and more particularly, relates to a method and apparatus for the compression of an integer multiplication table by utilizing a lookup table method to simplify the computational procedure of an integer multiplication method.

BACKGROUND OF THE INVENTION

In a conventional multiplication method executed by a microprocessor, the multiplication method is carried out by a software only method, a hardware only method, or a software/hardware simultaneous processing method. In a conventional microprocessor that does not have hardware multiplication instructions, a multiplication is performed by either a long multiplication method or by a direct table lookup method. The long multiplication method employed is similar to that normally performed manually and therefore, it has the drawback of a slow computational speed. For instance, in the example of a binary multiplication method, a long multiplication method is carried out by the following steps:

$$\begin{array}{r} X_1 X_0 \\ *Y_1 Y_0 \\ \hline (X_1 * Y_0)(X_0 * Y_0) \\ (X_1 * Y_1)(X_0 * Y_1) \\ \hline (X_1 * Y_1)[(X_1 * Y_0) + (X_0 * Y_1)](X_0 * Y_0) \end{array}$$

Wherein the bits of the multiplicand are $X_1$ and $X_0$, and the bits of the multiplier are $Y_1$ and $Y_0$. The first step calculation is $(X_1 X_0 * Y_0)$. The second step of the calculation is $(X_1 X_0 * Y_1)$. The final product is the sum of the above two partial products. When both bits are 1, the product is 1. When one of the bit is 0, the product is 0.

The procedure can be further illustrated by the binary multiplication method of (7*2) shown below:

$$\begin{array}{r} 1\ 1\ 1 \\ *\ \ \ 1\ 0 \\ \hline 0 \\ 1\ 1\ 1\ 0 \\ \hline 1\ 1\ 1\ 0 \end{array}$$

Wherein the required number of the partial products equals to the number of bits of the multiplier. The values of the partial products need to be stored in a temporary memory device.

The advantage of a binary long multiplication method is that it can be expressed in a simple and clear manner. However, to implement the long multiplication method by a hardware, the circuit required is very complicated which leads to low operational efficiency. Moreover, when a large multiplier is used, its operational speed decreases. For instance, in the calculation of two binary numbers, four partial products are required. In the calculation of two 4-bits numbers, then 16 partial products are necessary. It is therefore obvious that the binary long multiplication method can not be efficiently executed. Other drawbacks of the binary long multiplication method are the large memory space required, the long execution cycle time used, and the high cost. Since the product of each digit in the multiplication of a multiplicand and a multiplier needs to be stored individually such that the final product can be calculated, very large memory space is required. Furthermore, since each bit of the multiplicand and the multiplier must be multiplied, the number of multiplication required is proportional to the number of bits of the multiplier. The larger the multiplier, the longer the execution cycle time. The large memory space occupied by the partial products and the complex execution procedures required also lead to the necessity of a high cost microprocessor.

In order to overcome the drawbacks and the shortcomings of the binary long multiplication method, others have attempted to simplify the computational procedure by using a lookup table method. A lookup table is a multiplication table by using the multipliers and the multiplicands as the indices. The multiplication table can be stored in a read only memory (ROM) to facilitate usage. The lookup table method, even though enables a quick result to be found, is only applicable for small multiplication tables. When large multiplication tables are involved, the method requires a large memory space and a long retrieval time, and frequently encounters memory page-skipping problems. It is therefore desirable, in order to increase the computational speed and to save the memory space, to perform a multiplication by a simplified and efficient method.

It is therefore an object of the present invention to provide a method and apparatus for the compression of an integer multiplication table that does not have the drawbacks and shortcomings of the prior art methods.

It is another object of the present invention to provide a method and apparatus for the compression of an integer multiplication table that is capable of saving half of the memory space that is normally required.

It is a further object of the present invention to provide a method and apparatus for the compression of an integer multiplication table that eliminates the memory page-skipping problems.

It is another further object of the present invention to provide a method and apparatus for the compression of an integer multiplication table where data can be easily retrieved from a compressed table.

It is yet another object of the present invention to provide a method and apparatus for the compression of an integer multiplication table that utilizes a lookup table method to simplify the computational procedure of the multiplication of integers.

It is still another object of the present invention to provide a method and apparatus for the compression of an integer multiplication table that is capable of improved computational speed.

SUMMARY OF THE INVENTION

In accordance with the present invention, a method and apparatus for the compression of an integer multiplication table is provided.

The present invention multiplication table compression method includes the steps of first eliminating one of the two symmetrical and identical sections in the multiplication table; eliminating the products of 0 multiplier and 0 multiplicand; moving the product of the multiplier having an index of n into the location of index (n−1) for the multiplier (n is a natural number); using ½ of the number of the largest multiplier as the largest multiplier index for the compressed multiplication table; moving into the non-continuous memory space of the compressed multiplication table by a page-filling method the product of the largest multiplier index value that is larger than the compressed multiplication table such that the multiplication table after compression can be stored on the same page.

The present invention is further directed to an apparatus for looking up a multiplication table to retrieve data stored in the compressed multiplication table. The apparatus includes a sequencing device for accepting multiplier and multiplicand as input values and then place them in sequence such that the multiplicand is always larger than the multiplier; an arbiter for determining whether the multiplier is 0 and setting the product to 0 when the multiplier is 0; a highest bit checking device for determining whether the highest bit of the multiplier is 1 or 0, and then outputting the result of the determination to an address converter; an address converter for calculating a new index value and then converting the multiplicand to a first index value, the multiplier into a second index value in order to retrieve from the compressed multiplication table.

BRIEF DESCRIPTION OF THE DRAWINGS

Other objects, features and advantages of the present invention will become apparent upon consideration of the specification and the appended drawings, in which.

DETAILED DESCRIPTION OF THE PREFERRED EMBODIMENT

Figure 1A:
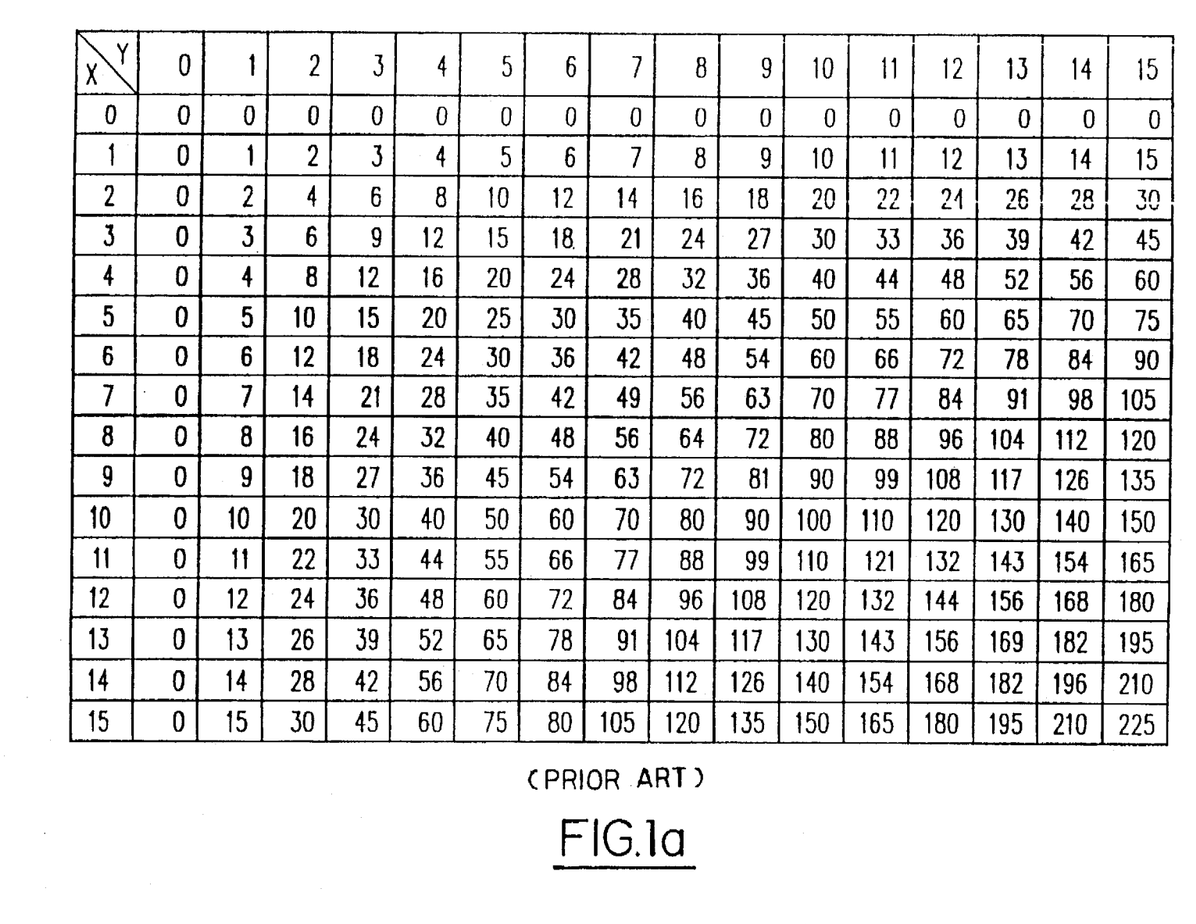
FIG. 1a is a prior art 4-bit*4-bit multiplication table.
Figure 1B:
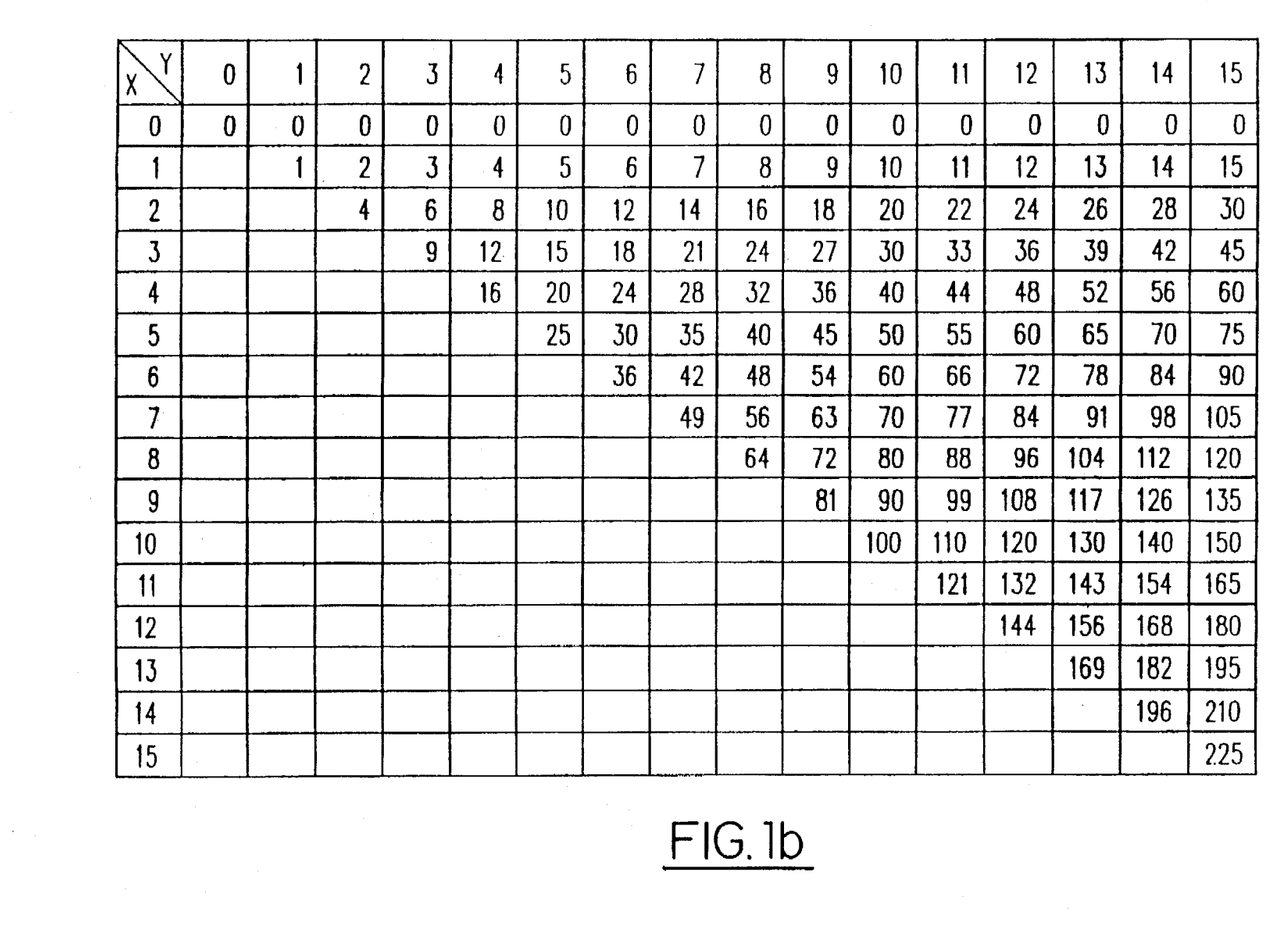
FIG. 1b is a 4-bit*4-bit multiplication table wherein the identical and symmetrical portions are eliminated.
Figure 1C:
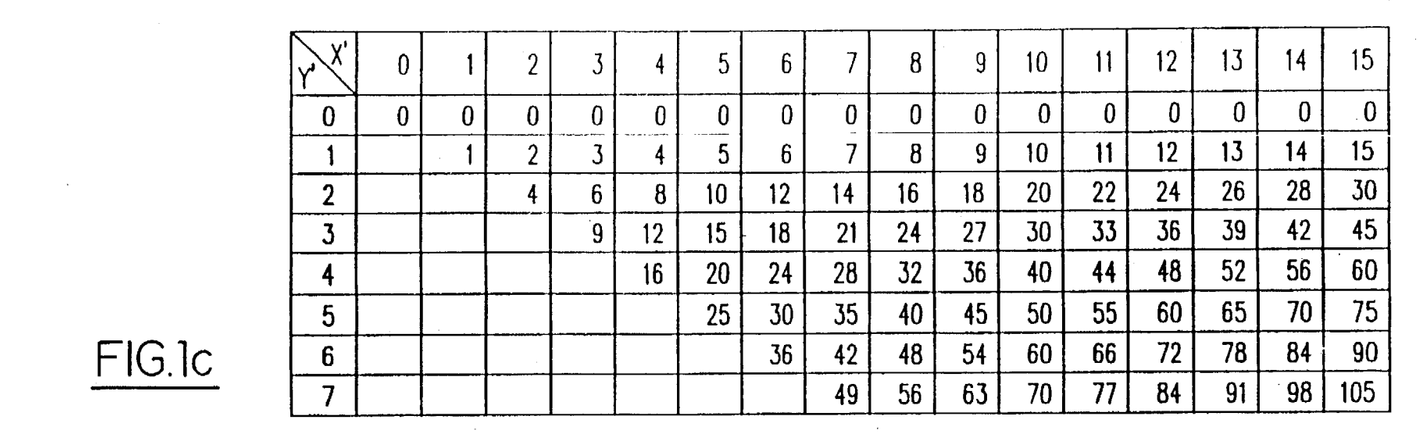
FIG. 1c is a 4-bit*4-bit multiplication table with the portions where the product is 0 and where the products are from a multiplier larger than 8 eliminated.
Figure 1D:
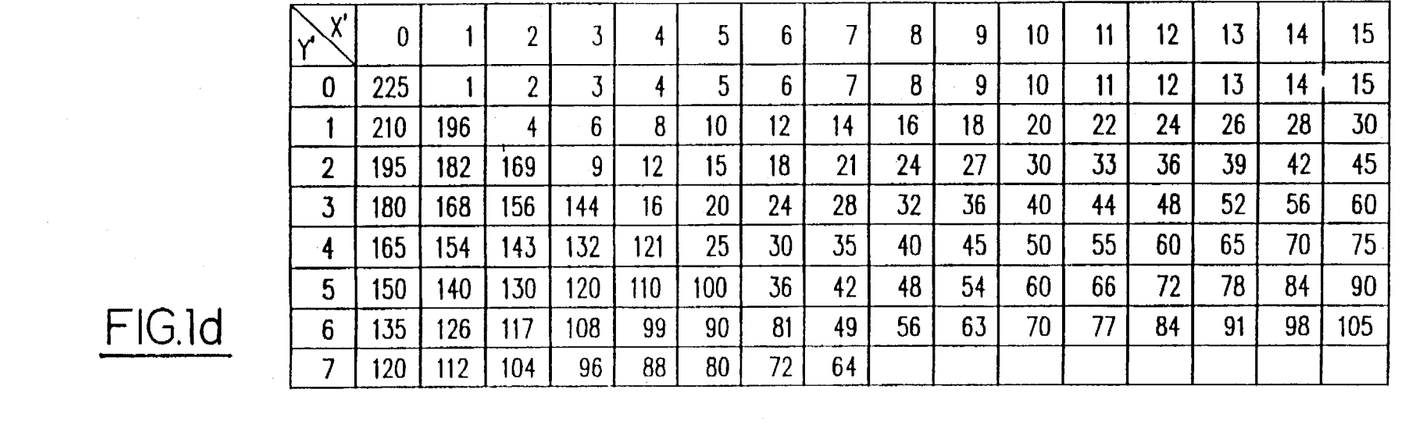
FIG. 1d is a compressed 4-bit*4-bit multiplication table wherein the products of multipliers larger than 8 are moved into the blank space shown in the table of FIG. 1c.

Referring initially to FIGS. 1b through 1d where the present invention method of compressing a multiplication table is shown. FIG. 1a shows a prior art 4-bit*4-bit integer multiplication table before compression, where X represents the multiplicand index and Y represents the multiplier index.

FIG. 1b shows the table of FIG. 1a with its identical and symmetrical products removed. Based on the commutative property law of multiplication, i.e. A*B=B*A, the products shown in FIG. 1a are presented in a symmetrical and identical manner along the diagonal line. It is therefore possible to obtain the correct products after the elimination of half the product values in the multiplication table by exchanging the multiplier and the multiplicand whenever the multiplier is larger than the multiplicand.

FIG. 1c shows the multiplication table of FIG. 1b with the elimination of all the products of multipliers that are or equal to than 8. The compressed multiplication table shown in FIG. 1c has eliminated the products shown in FIG. 1b that are from multipliers larger than 8, in order to fill in the blanks in the table of FIG. 1c to achieve the effect of compression, and to eliminate the page-skipping problems.

A final compressed multiplication table is shown in FIG. 1d. The products of multipliers larger than 8 shown in FIG. 1b are filled into the blanks in the table of FIG. 1c according to the present invention method such that a completely compressed multiplication table is obtained since 0 times any number becomes 0,it is possible to detect whether a multiplier is 0 before looking up a table so that the products that are 0 are not stored into a multiplication table in order to save space.

Figure 2:
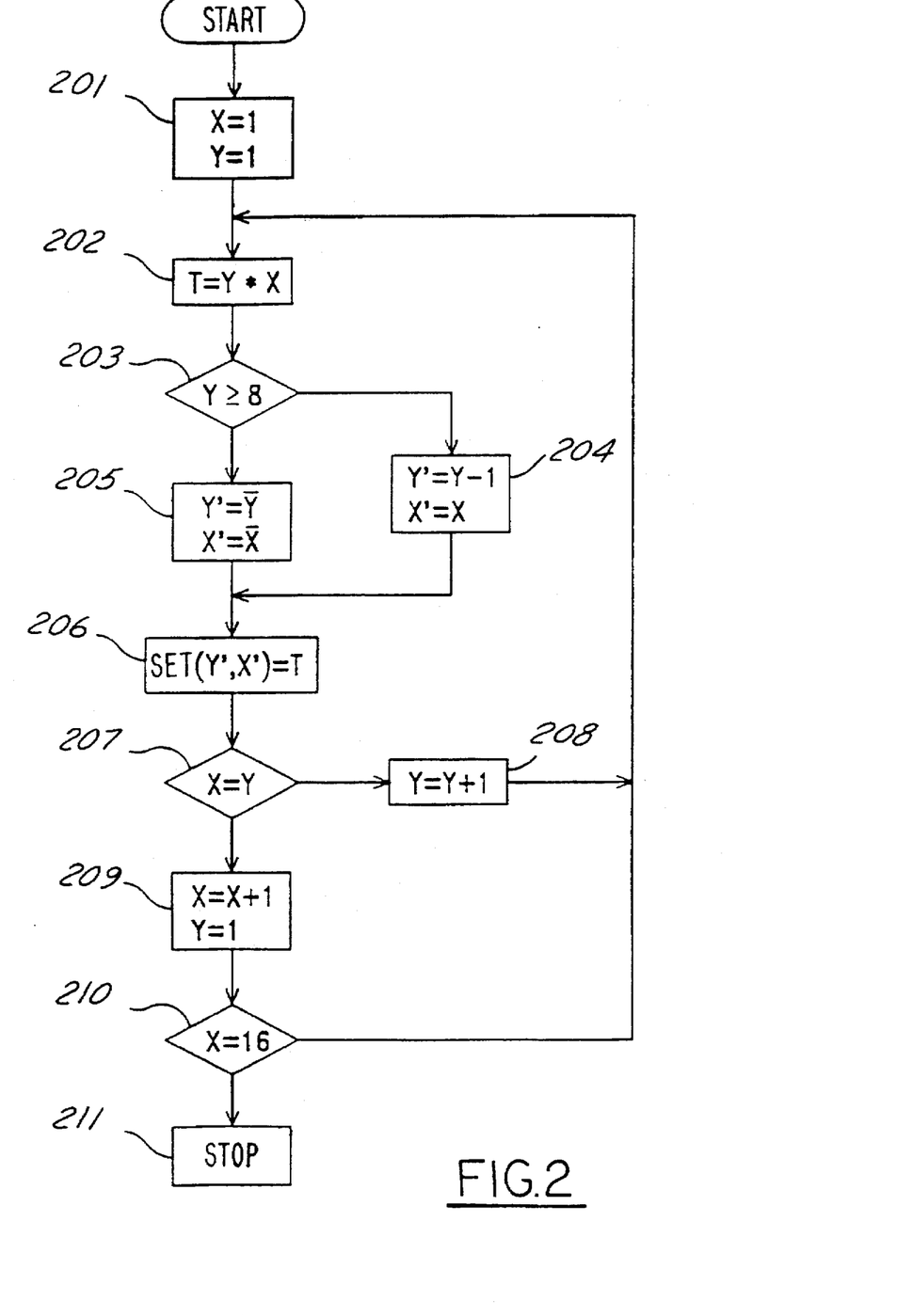
FIG. 2 is a flow chart of the method for setting up a compressed multiplication table.

The steps for filling in the present invention compressed multiplication table is shown in the flow chart of FIG. 2. X is designated as the multiplicand and Y is designated as the multiplier. Starting at the (1,0) position of the multiplication table shown in FIG. 1d to fill in the product values by the following steps:

201: Set X=1, Y=1;

202: Obtain the product of X*Y=T;

203: Test if Y is larger or equal to 8, if yes, execute 205; if no, execute 204;

204: Store Y−1 into Y', X value is not changed and is stored into X', execute 206;

205: Store the inverse value $\overline{X}$ of X into X', the inverse value $\overline{Y}$ of Y into Y';

206: Store the product T into the (Y', X') location in the compressed multiplication table;

207: Compare X and Y, if X=Y, execute 209; otherwise execute 208;

208: Set Y=Y+1, execute 202;

209: Set X=X+1, set Y=1;

210: Test whether X is 16, if yes, execute 211; if no, execute 202;

211: End page-filling.

Figure 3:
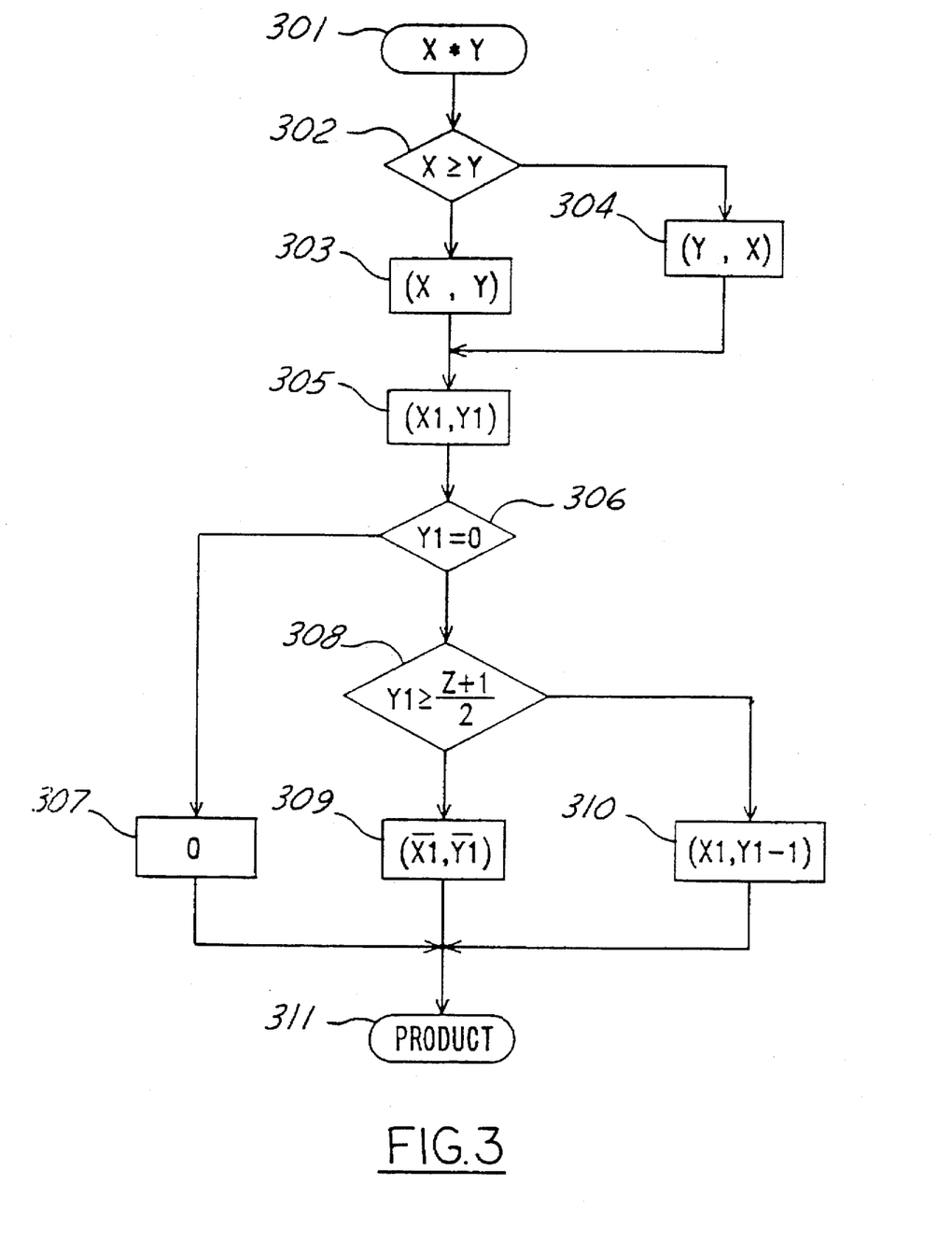
FIG. 3 is a flow chart for the process of retrieving data from the compressed multiplication table.

A method of retrieving data from the above compressed multiplication table is shown in the flow chart of FIG. 3. Using X*Y as an example, the retrieving steps are as follows:

301: Set X as the first value, Y as the second value;

302: Determine if X is larger than or equal to Y, if yes, execute 303; if no, execute 304;

303: If X is larger than Y, set the index address as (X, Y), execute 305;

304: If X is smaller than Y, exchange X and Y, set the index address as (Y, X);

305: Set the index address after the comparison as ($X_1$, $Y_1$);

306: Check if $Y_1$ is 0, if yes, execute 307; if no, execute 308;

307: Output 0, execute 311;

308: Check if $Y_1$ is larger or equal to (Z+1)/2 where Z is the largest multiplicand, if yes, execute 309; if no, execute 310;

309: Set the index address for looking up the table as ($\overline{X}_1$, $\overline{Y}_1$), lookup the table with this address, execute 311;

310: Set the index address for looking up the table as ($X_1$, $Y_1-1$), use this address to lookup the table, execute 311;

311: Output the result from looking up the table, or 0.

The above table lookup method can be carried out by the present invention multiplication table lookup apparatus. The apparatus includes a sequencing device for inputting multipliers and multiplicands and arrange them in a sequence such that the multiplicand is always larger than the multiplier. The sequencing device is used to execute the above table lookup step 301 through step 305.

The present invention multiplication table lookup apparatus further includes an arbiter for determining whether the multiplier is 0. When the multiplier is 0, then the product must also be 0. Since the data has been processed by the sequencing device and the multiplier and the multiplicand have been resequenced, the multiplier must be smaller than the multiplicand. The arbiter, therefore, only requires to examine the multiplier and not the multiplicand. The function of the arbiter is to further save the memory space in a multiplication table. Since 0 times any number equals to 0, it only requires to determine whether the multiplier is 0 to know whether the product is 0. There is no need to store the 0 product into the multiplication table. The arbiter is used to execute the table lookup steps 306 and 307.

The present invention multiplication table lookup apparatus further includes a highest bit checking device. The checking device is used to determine whether the highest bit of the multiplier is 1 or 0, and then output the result of the determination to an address converter. When the multiplier is a 4-bit number, it minus one to become a 3-bit number which is the largest multiplier after compression. Since the largest number that is represented by a 3-bit number is 7, by determining whether the highest bit of the multiplier is 1 or 0, it can be decided whether its value is larger or equal to 8. The highest bit checking device is used to execute the table lookup step 308 to determine whether the multiplier is larger or equal to $(Z+1)/2$ where Z is the largest multiplicand. When the highest bit of the multiplier is 1, it indicates that the multiplier is larger or equal to $(Z+1)/2$. When the highest bit of the multiplier is 0, it indicates that the multiplier is smaller than $(Z+1)/2$.

Figure 4:
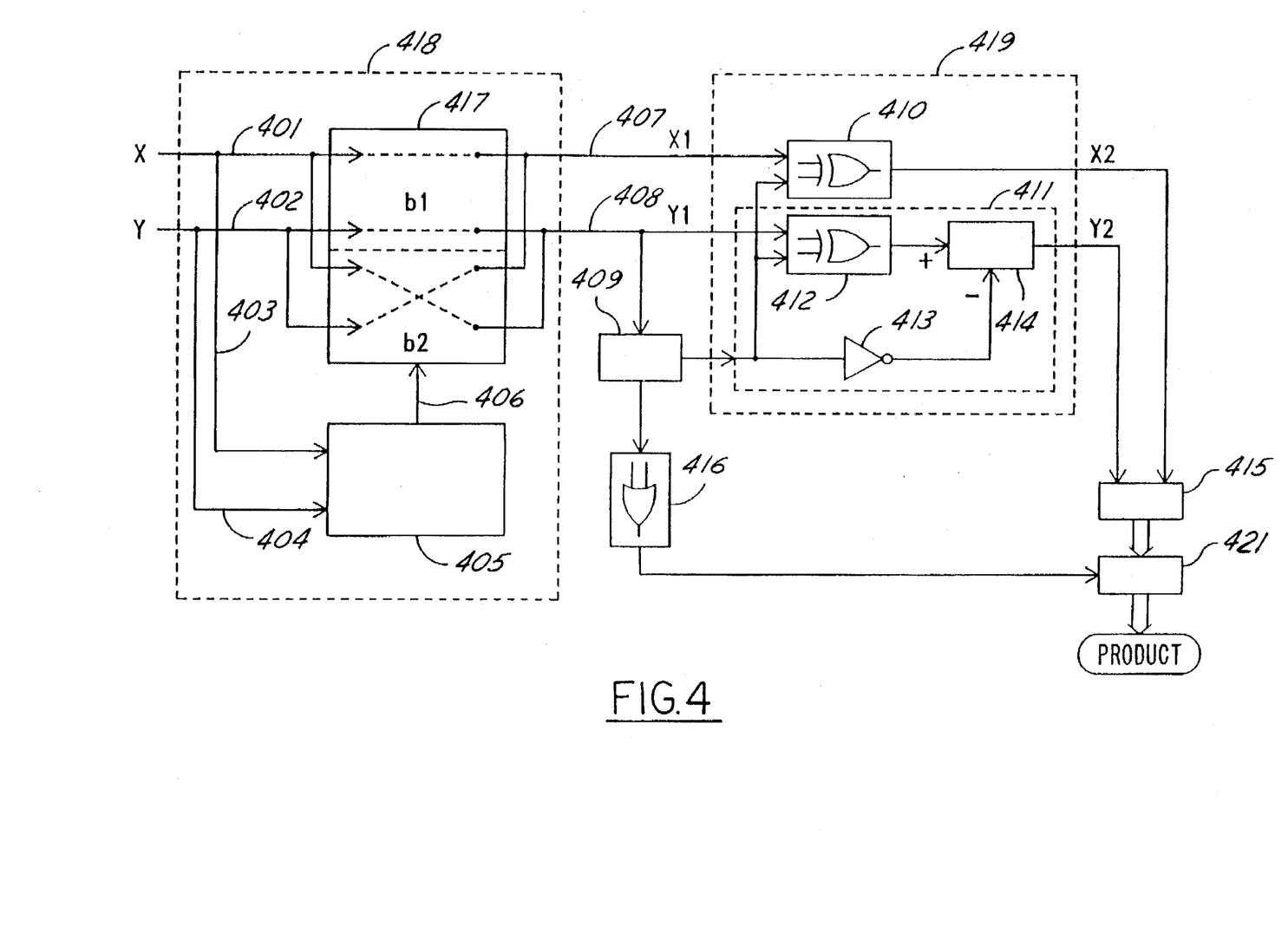
FIG. 4 is a functional block diagram of the present invention method.

The present invention multiplication table lookup apparatus further includes an address converter. The address converter is used to calculate a new index value and then convert the multiplicand into a first index value, the multiplier into a second index value in order to retrieve data from the compressed multiplication table. The converting device is used to execute the table lookup steps 309 through 310 as shown in FIG. 4. The address converting device 419 includes a first EXCLUSIVE OR gate 410, a second EXCLUSIVE OR gate 412, an inverter 413, and a subtractor 414. The address index $X_1$ and the output from the highest bit checking device 409 are inputted into the first EXCLUSIVE OR gate 410 in order to produce a first index value $X_2$. The address index $Y_1$ and the output from the highest bit checking device 409 are inputted into the second EXCLUSIVE OR gate 412 and the inverter 413, and then through the subtractor 414 to subtract 1 in order to obtain the second index value $Y_2$.

The relationship between ($X_2$, $Y_2$) and ($X_1$, $Y_1$) is shown in FIG. 3. When $Y_1 \geq (Z+1)/2$, or when the highest bit of $Y_1$ is 1 and the output from the highest bit checking device 409 is 1, $X_2=\overline{X}_1$, $Y_2=\overline{Y}_1$. When $Y<(Z+1)/2$, or when the highest bit of $Y_1$ is 0 and the output from the highest bit checking device 409 is 0, $X_2=X_1$, $Y_2=Y_1-1$; the index of ($X_2$, $Y_2$) is inputted into a read only memory 415 for looking up the table. The apparatus is used to execute the table lookup steps 308 through 310.

FIG. 4 shows a functional block diagram for the present invention. The first value X is inputted from input passage 401 and the second value Y is inputted from input passage 402 into a sequencing device 418. The sequencing device 418 includes a comparator 405 and an address exchanging device 417. Through passageways 403 and 404, the first value X and the second value Y are inputted into the comparator 405. The result of comparison between X and Y is then outputted from 406 to control the exchanger 417 and to determine whether the output connection for the first value X and the second value Y should be exchanged. After a comparison between X and Y is made by the comparator 405, if it is discovered that $X \geq Y$, then select an output passage $b_1$, or connecting the first value X from line 401 to line 407 and the second value Y from line 402 to line 408. If after comparison between X and Y by the comparator 405, it is discovered that $X<Y$, then select the output passage $b_2$ to connect the first value X from line 401 to line 408 and the second value Y from line 402 to line 407 in order to achieve the exchange of the passage connection. The data on passage 407 is the first value $X_1$, the data on passage 408 is the second value $Y_1$.

The first value $X_1$, the second value $Y_1$, and the output from the highest bit checking device 409 are inputted into an address converting device 419 to calculate a new index value. The address converting device 419 includes a first index generator 410 and a second index generator 411. The second index generator 411 is constructed by a second EXCLUSIVE OR gate 412, an inverter 413, and a subtractor 414. The first value $X_1$ and the output from the highest bit checking device 409 are inputted into the first index generator 410 to produce the first index $X_2$. The address index $Y_1$ and the output from the highest bit checking device 409 are inputted into a second EXCLUSIVE OR gate 412 and an inverter 413.

The arbiter 416 determines whether $Y_1$ is 0. When $Y_1$ is 0, then output a "0" bit. If $Y_1$ is not 0, then output a "1" bit. AND gate 421 is used to perform an "AND" logic calculation between the temporary product and the output from the arbiter 416 in order to output the product of the first value X and the second value Y.

Figure 5:
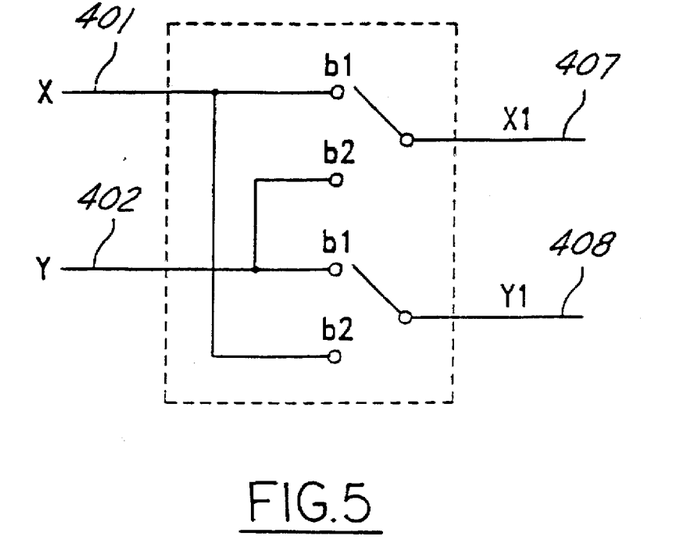
FIG. 5 is the circuit for the sequencing device of FIG. 4.

FIG. 5 is a circuit for the sequencing device shown in FIG. 4. Passage 401, passage 402 and passage 407 are controlled through a switch to select an output of either $b_1$ or $b_2$.

Figure 6:
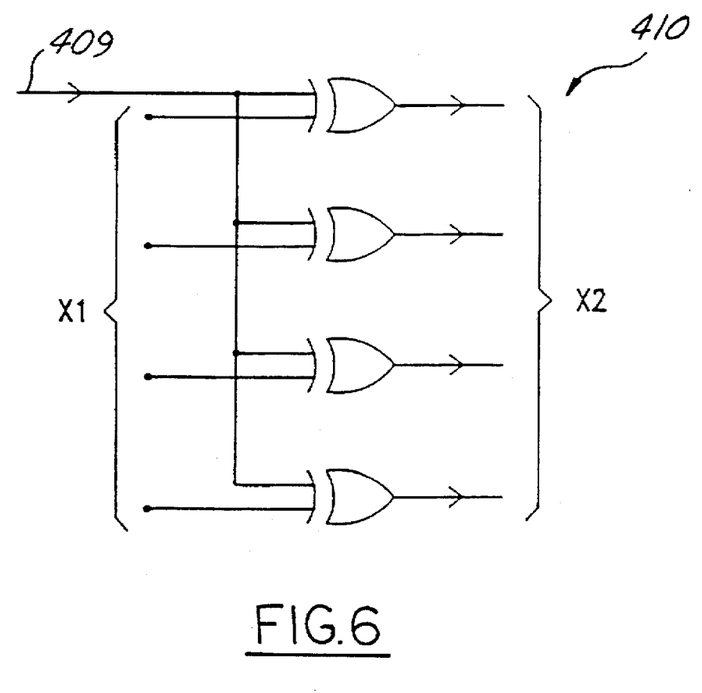
FIG. 6 is the logic circuit for the first index generating device shown in FIG. 4.

FIG. 6 shows that when the first value X and the second value Y shown in FIG. 4 are each a 4-bit number, the first EXCLUSIVE OR gate 410 executes and generates a first index value $X_2$ from a first value $X_1$. Through the first EXCLUSIVE OR gate 410 of FIG. 6, when the highest bit of $Y_1$ is 1, which indicates $Y_1 \geq (15+1)/2$, or $Y_1 \geq 8$ which obtains $X_2$ as $\overline{X}_{-1}$. When the highest bit of $Y_1$ is 0 which indicates $Y_1 < (15+1)/2$, or $\overline{Y}_1 < 8$ to obtain $X_2$ which is $X_1$.

Figure 7:
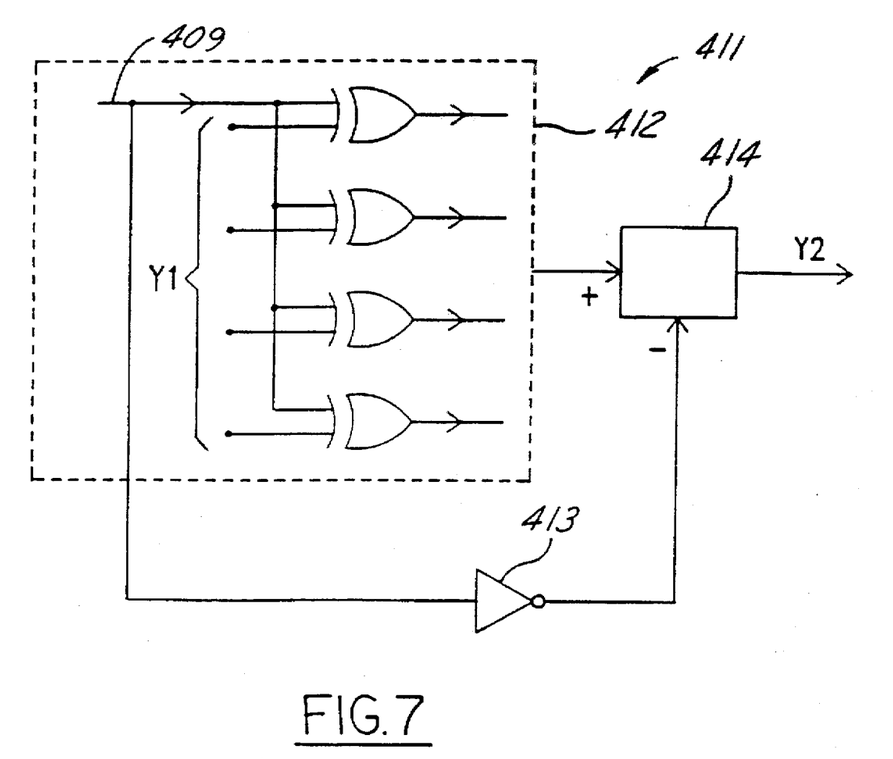
FIG. 7 is the logic circuit for the second index generating device shown in FIG. 4.

When the first value X and the second value Y shown in FIG. 4 are each a 4-bit number, FIG. 7 shows that the second EXCLUSIVE OR gate 412, the inverter 413, and the subtractor 414 through the operation of minus 1 are used to obtain the second index value $Y_2$. When the highest bit of $Y_1$ is 1, which indicates $Y_1 \geq (15+1)/2$ or $Y_1 < 8$ to obtain $Y_2$ as $\overline{Y}$. When the highest bit of $Y_1$ is 0, which indicates $Y_1 < (15+1)/2$, or $Y_1 < 8$ to obtain $Y_2$ as $Y_1-1$. When the highest bit of $Y_1$ is 0, through the inverter 413 to make the subtractor 414 to execute a minus 1 operation. When the highest bit of $Y_1$ is 1, through the inverter 413 to stop the subtractor 414 from action.

Figure 8:
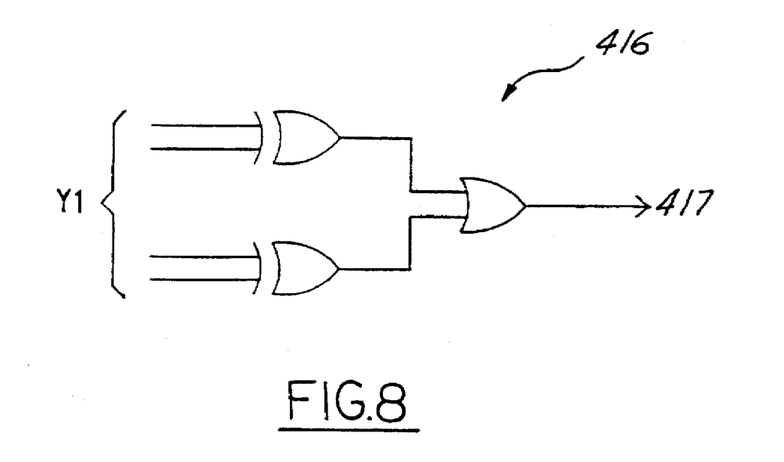
FIG. 8 is the logic circuit for the OR gate of FIG. 4.

When the first value X and the second value Y of FIG. 4 are each a 4-bit number, FIG. 8 shows that an arbiter 416 executes to determine if $Y_1$ is 0. Through the arbiter 416, if $Y_1$ is 0, then output "0" to AND gate 417 to make the output of AND gate 417 0. When $Y_1$ is not 0, then output "1" to the AND gate 417 to make the AND gate to temporarily set a product output as the product of the first value X and the second value Y.

While the present invention has been described in an illustrative manner, it should be understood that the technology used is intended to be in a nature of words of description rather than of limitation.

Furthermore, while the present invention has been described in terms of a preferred embodiment thereof, it is to be appreciated that those skilled in the art will ratherly apply these teachings to other possible variations of the invention.

The embodiments of the invention in which an exclusive property or privilege is claimed are defined as follows:

We claim:

1. A method for the compression of an integer multiplication table such that the multiplication table can be reduced to half of its uncompressed size and can be executed without page-skipping problems comprising the steps of:

eliminating one of two symmetrical and identical sections in said multiplication table, eliminating the product of a multiplier of 0 and a multiplicand of 0, moving the product of the multiplier at a location of index n into a location of index (n−1) for the multiplier where n is a natural number, selecting one-half of the number of the largest multiplier as the largest multiplier index for the compressed multiplication table, and moving into a non-continuous memory space of the compressed multiplication table by a page filling method the product at the largest multiplier index that is larger than the compressed multiplication table such that the multiplication table after compression can be stored on the same page.

2. A multiplication table lookup apparatus for retrieving from a compressed multiplication table comprising:

a sequencing device for inputting a first value and a different second value, and then placing the two values in sequence such that said first value is larger than said second value, an arbiter for determining whether said second value is 0, a highest bit checking device for determining whether a highest bit of said second value is 1 or 0, and then outputting the result of said determination to an address convertor, and an address convertor for converting said first value into a first index, said second value into a second index based on the determination of said highest bit checking device to retrieve a product from said compressed multiplication table.

3. An apparatus according to claim 2, wherein said sequencing device further comprising:

a comparator for comparing said first value and said second value and then outputting the result of the comparison, and an exchanger for accepting said first value and said second value and then based on the output from said comparator, exchanging said first value with said second value such that said first value is always larger than said second value.

4. An apparatus according to claim 2, further comprising:

an AND gate for executing an AND operation on a retrieved product and the output from said arbiter, and then outputting the product of said first value and said second value.

5. An apparatus according to claim 2, wherein said address convertor further comprising:

a first index generator for accepting said first value and then outputting a first index based on the output from said highest bit checking device, and a second index generator for accepting said second value and then outputting a second index based on the output from said highest bit checking device.

6. An apparatus according to claim 5, wherein said first index generator further comprising a step of setting the complement value of said first value as said first index when the output from said highest bit checking device is 1; and setting said first value as said first index when said output from the highest bit checking device is 0.

7. An apparatus according to claim 5, wherein said first index generator further comprising:

a first EXCLUSIVE OR gate for accepting said first value and then based on the output from said highest bit checking device to output said first index.

8. An apparatus according to claim 5, wherein said second index generator further performing the steps of:

setting said second value as said first index when the output from the highest bit checking device is 1; setting said first value minus 1 as said first index when the output from the highest bit checking device is 0.

9. An apparatus according to claim 5, wherein said second index generator further comprising:

a second EXCLUSIVE OR gate for executing a logic operation between said second value and the result from said highest bit checking device and then outputting a result, an inverter for inverting the output from said highest bit checking device, and a subtractor for subtracting an inverted output from the result of said second EXCLUSIVE OR gate to obtain said second index.

10. An apparatus according to claim 9, wherein said second EXCLUSIVE OR gate further performing the steps of:

setting the second index as the complement value of said second value when the output from said highest bit checking device is 1; setting said second index as said second value when the output from said highest bit checking device is 0.

11. A method of looking up a compressed multiplication table to obtain a product between a first value and a second value wherein the first value is different than the second value comprising the steps of:

reading said first value and said second value as input, and then sequencing said two values such that said first value is larger than said second value, determining whether said second value is 0, and outputting the result of the determination, determining whether a highest bit of said second value is 1 or 0 and then outputting the result of the determination, converting said first value to a first index and said second value to a second index based on the result of determination in the above step, retrieving a product from said compressed multiplication table based on said first index and said second index, and performing an AND gate calculation on said retrieved product and said second value in order to obtain a product of said first value and said second value.

12. A method according to claim 11 wherein said sequencing step further comprising the step of exchanging said first value and said second value when said second value is larger than said first value.

13. A method according to claim 11, wherein said first value and said second value are each a 4-bit binary number.

14. A method according to claim 11 further comprising the step of when said second value is 0, outputting 0 directly as the product of said first value and said second value.

15. A method according to claim 11 further comprising the step of:

setting the complement value of said first value as the first index when the highest bit of said second value is 1, and setting said first value as said first index when the highest bit of said second value is 0.

16. A method according to claim 11 further comprising the step of:

setting the complement value of said second value as the second index when the highest bit of said second value is 1, and setting said second value minus 1 as the second index when the highest bit of said second value is 0.

17. A method according to claim 11, wherein said compressed multiplication table is a 4-bit*4-bit multiplication table.

* * * * *